United States Patent [19]

Masunaga

[11] Patent Number: 5,563,631
[45] Date of Patent: Oct. 8, 1996

[54] PORTABLE INFORMATION APPARATUS

[75] Inventor: Makoto Masunaga, Tokyo, Japan

[73] Assignee: Canon Kabushiki Kaisha, Tokyo, Japan

[21] Appl. No.: 325,825

[22] Filed: Oct. 19, 1994

[30] Foreign Application Priority Data

Oct. 26, 1993 [JP] Japan ............................ 5-267262

[51] Int. Cl.⁶ .................................................... G09G 5/00
[52] U.S. Cl. .......................... 345/169; 345/161; 345/163; 345/167
[58] Field of Search ........................ 345/156, 157, 345/160, 161, 163, 167, 168, 169, 158, 901; 382/313

[56] References Cited

U.S. PATENT DOCUMENTS

| | | | |
|---|---|---|---|
| 4,005,388 | 1/1977 | Morley et al. | 345/169 |
| 4,670,743 | 1/1987 | Zemke | 345/168 |
| 4,816,622 | 3/1989 | Holloway | 345/161 |
| 4,887,968 | 12/1989 | Wickstead et al. | 345/157 |
| 5,095,303 | 3/1992 | Clark et al. | 345/163 |
| 5,160,919 | 11/1992 | Mohler et al. | 345/168 |
| 5,208,736 | 5/1993 | Crooks et al. | 345/167 |
| 5,382,962 | 1/1995 | Young | 345/167 |
| 5,426,449 | 1/1995 | Danziger | 345/168 |

FOREIGN PATENT DOCUMENTS

| | | |
|---|---|---|
| 60222921 | 11/1985 | Japan . |
| 9109363 | 6/1991 | WIPO ............................ 345/167 |

Primary Examiner—Richard Hjerpe
Assistant Examiner—Regina Liang
Attorney, Agent, or Firm—Fitzpatrick, Cella, Harper & Scinto

[57] ABSTRACT

A portable information displaying apparatus includes an information display unit provided on a first surface of a casing and including a pointer displayed thereon. The apparatus further includes a controller for controlling the movement of the pointer. In one embodiment, the controller is a mouse positioned on the bottom surface of the apparatus which rotates in a freely-selected direction. Alternatively, the controller can comprise first, second, and/or third roller members, each usable to control movement of the pointer along one axis. In addition, a dial member can be provided which is rotatable about an axis perpendicular to the upper surface of the apparatus. These elements of the controller are positioned along side walls of the apparatus. In another embodiment, a track ball and/or first and second slide levers and/or a joystick is provided along a side wall of the apparatus to control the movement of the pointer. In addition, a click button can be provided which is usable in association with the pointer to input information into the apparatus.

28 Claims, 10 Drawing Sheets

PORTABLE INFORMATION APPARATUS

BACKGROUND OF THE INVENTION

1. Field of the Invention

This invention relates generally to portable information apparatuses and, more particularly, to a portable information apparatus such as an electronic memorandum book, a handy type computer or any other handy communication terminal.

1. Description of the Related Art

Many ideas and devices for handy type portable information apparatuses such as personal computers have recently been proposed, and pen input type information apparatuses are now becoming popular among such information apparatuses by replacing those using a keyboard for input operation.

FIG. 11 shows an example of this kind of portable information apparatus. The portable information apparatus shown in FIG. 11 has a main body 1 held by, for example, a left hand 200 of an operator. An information display 2 is provided in an upper surface 3 of the apparatus body 1 to display various information including operation information. The information display 2 displays icons 4, a menu bar 5, and a pointer 6 for selecting each of icons 4 and the contents of the menu bar 5 to be operated on the information display 2, and for designating a drawing position. The information apparatus also includes groups of operating buttons 7 arranged in the upper surface 3 of the main body 1, and an input pen 8 held by, for example, a right hand 100 of the operator and operable to select one of the icons 4 or to designate the content of the menu bar 5 by moving the pointer 6 on the information display 2. The information display 2 has a digitizing function such that information can be input thereto with the input pen 8.

To use the portable information apparatus thus constructed, the apparatus body 1 is first held by the left hand 200 while the input pen 8 is held by the right hand 100. Then the operator selects one of the icons 4 and designates the contents of the menu bar 5 by moving the pointer 6 with the input pen 8 while watching the display on the information display 2 disposed in the upper surface 3 of the apparatus body 1. Further, the operator performs other operations of, for example, drawing by moving the pointer 6. For operation inputs which cannot be completed only by selecting the icons 4 and the contents of the menu bar 5 and inputting data with the pointer 6 or operation inputs for simplifying such operations, auxiliary operations of selecting one of groups of operating buttons 7 or a combination of these buttons 7 are used.

Pen input computers, handy information apparatuses and handy terminals presently known are operated by input operations similar to those described above.

For the above-described conventional portable information apparatus, however, it is necessary to use the left hand 200 to hold the apparatus body 1 and the right hand 100 to operate the input pen 8. It is also necessary to perform the operation of taking the input pen 8 out of a pen holder or the like before use and putting it back in the pen holder after use. On the other hand, in some cases, there is a need for a cable connecting the input pen 8 to the main body 1, which reduces the facility with which the input pen 8 is operated. In the case of a type of input pen 8 requiring no cable, there is a possibility of the input pen 8 being lost. If the operator wishes to handle the apparatus by one hand, the operator must place the apparatus body 1 on a table or otherwise support it. However, the operator may frequently use this kind of portable apparatus while being on the phone or performing another operation. In such a situation, each time the operator uses the input pen 8, the operator takes the input pen 8 out of the pen holder and positions the input pen 8 before operating it. Actually, the input operation cannot be performed always easily or efficiently, if such a procedure is required. Such a procedure of taking out and using the special input pen 8 is very troublesome particularly when the input pen 8 is used to look up an address book, a schedule and a telephone directory and to input necessary data. There is, therefore, a strong demand for an information apparatus which can be operated easily by one hand.

SUMMARY OF THE INVENTION

An object of the present invention is to provide a portable information displaying apparatus arranged so that a simple input operation can be performed by one hand.

Another object of the present invention is to control the movement of a pointer in an information display of a portable information displaying apparatus by a movement input control means, such as a roller, a track ball, a slide lever or a joystick, provided in the information displaying apparatus.

Still another object of the present invention is to provide a portable information displaying apparatus in which data is input by a clicking operation of a click button.

According to one aspect, the present invention which achieves at least one of these objectives relates to a portable information displaying apparatus comprising an information display unit provided on a first surface of a casing and including a pointer displayed thereon. The apparatus further comprises movement input control means, provided in a second surface of the casing opposite the first surface, for controlling the movement of the pointer of the information display unit by rotating in a freely-selected direction.

In one embodiment, this apparatus further includes a click button provided in a surface other than the second surface in which the movement input control means is disposed, the click button being usable in association with the pointer to input information. The direction of rotation of the movement input control means and the direction of movement of the pointer can coincide with each other or can be opposite each other. In addition, a setting means may be provided for selectively setting the relationship between the direction of rotation of the movement input control means and the direction of movement of the pointer.

According to another aspect, the present invention which achieves at least one of these objectives relates to a portable information displaying apparatus, comprising an information display unit provided in a first surface of a casing and including a pointer displayed thereon. The apparatus further comprises a first roller member provided in a second surface of the casing perpendicular to the first surface. The first roller member is usable to control the movement of the pointer along a first axis of the information display unit. The apparatus further comprises a second roller member provided in a third surface of the casing perpendicular to each of the first and second surfaces. The second roller member is usable to control the movement of the pointer along a second axis of the information display unit.

The first roller member can be disposed in the second surface at a position closer to a fourth surface of the casing opposite to the first surface than the first surface. In addition, the second roller member can be disposed in the third surface at a position closer to the fourth surface than the first surface. In addition, a click button can be provided in a fifth surface, different than the second surface in which the first roller member is disposed, the third surface in which the second roller member is disposed. The fifth surface is perpendicular to the first surface. Such a click button is usable in association with the pointer to input information. Alternatively, the click button can be provided in the second surface in which the first roller member is disposed, adjacent the first roller member.

According to another aspect, the present invention which achieves at least one of these objects relates to a portable information displaying apparatus, comprising an information display unit provided in a first surface of a casing and including a pointer displayed thereon. The apparatus further comprises first, second, and third roller members. The first roller member is provided in a second surface of the casing perpendicular to the first surface. The first roller member is usable to control the movement of the pointer along a first axis on the information display unit. The second roller member is provided in a third surface of the casing, perpendicular to each of the first and second surfaces. The second roller member is usable to control the movement of the pointer in one of opposite directions along a second axis of the information display unit. The third roller member is provided in a fourth surface of the casing which is perpendicular to each of the first surface and a fifth surface opposite from the first surface. The fourth surface is opposite from the second surface. The third roller member is usable to control movement of the pointer in the other of opposite directions along the second axis on the information display unit.

In one embodiment, the first roller member is disposed in the second surface at a position closer to the fifth surface than the first surface. The second roller member is disposed in the third surface at a position closer to the fifth surface than the first surface. The third roller member is disposed in the fourth surface at a position closer to the fifth surface than the first surface. In addition, a click button can be provided in at least one of the second surface in which the first roller member is disposed, the third surface in which the second roller member is disposed, and the fourth surface in which the third roller member is disposed. Alternatively, the click button can be provided adjacent the first roller member.

According to another aspect, the present invention which achieves at least one of these objectives relates to a portable information displaying apparatus comprising an information display unit provided in a first surface of a casing and including a pointer displayed thereon. The apparatus further comprises a roller member provided in a second surface of the casing perpendicular to each of the first surface and a third surface opposite from the first surface. The first roller member is usable to control the movement of the pointer along a first axis of the information display unit. The apparatus also includes a dial member provided in a fourth surface of the casing perpendicular to each of the first and second surfaces. The dial member is rotatable about an axis perpendicular to the first surface to control the movement of the pointer along a second axis on the information display unit.

In one embodiment, the roller member is disposed in the second surface at a position closer to the third surface than the first surface. In addition, a click button can be provided in a surface of the casing other than the second surface and the fourth surface. The click button is usable in association with the pointer to input information.

According to still another aspect, the present invention which achieves at least one of these objectives relates to a portable information displaying apparatus comprising an information display unit provided in a first surface of a casing and including a pointer displayed thereon. The apparatus further comprises a track ball provided in one of second and third surfaces of the casing, each perpendicular to the first surface and a fourth surface opposite from the first surface. The track ball is usable to control the movement of the pointer on the information display unit. The apparatus further comprises a click button provided adjacent to the track ball and usable in association with the pointer to input information.

According to yet another aspect, the present invention which achieves at least one of these objectives relates to a portable information displaying apparatus comprising an information display unit provided in a first surface of a casing and including a pointer displayed thereon. The apparatus further comprises a track ball provided in one of second and third surfaces of the casing, each perpendicular to the first surface and a fourth surface opposite from the first surface. The track ball is usable to control the movement of the pointer on the information display unit. The click button is provided in the other of the second and third surfaces and is usable in association with the pointer to input information.

According to still another aspect, the present invention which achieves at least one of these objectives relates to a portable information displaying apparatus comprising an information display unit provided in a first surface of a casing and including a pointer displayed thereon. The apparatus further comprises first and second slide levers. The first slide lever is provided in one of second and third surfaces of the casing, each perpendicular to the first surface and a fourth surface opposite from the first surface. The first slide lever is usable to move the pointer along a first axis of the information display unit. The second slide lever is provided on a fifth surface perpendicular to the second and third surfaces. The second slide lever is movable to move the pointer along a second axis on the information display unit.

In one embodiment, the first slide lever has a neutral point at which the first slide lever does not function to move the pointer along the first axis, and the second slide lever has a neutral point at which the second slide lever does not function to move the pointer along the second axis. In addition, means can be provided for biasing each of the first and second slide levers toward the neutral point.

According to still another aspect, the present invention which achieves at least one of these objectives relates to a portable information displaying apparatus comprising an information display unit provided in a first surface of a casing and including a pointer displayed thereon. The apparatus further comprises lever means provided at a corner position where two surfaces perpendicular to the first surface intersect each other. The lever means is usable to move the pointer in an arbitrary direction on the information display unit.

In this embodiment, the lever means can have a neutral point at which its does not function to move the pointer in any direction. In addition, means for biasing the lever means toward the neutral point can be provided.

According to yet another aspect, the present invention which achieves at least one of these objectives relates to a portable information displaying apparatus comprising an information display unit provided in a first surface of a casing and including a pointer displayed thereon. The apparatus further comprises a joystick provided in at least one of surfaces of the casing perpendicular to the first surface. The joystick is capable of moving the pointer along a first axis or a second axis of the information display unit.

The joystick may have a neutral point at which it does not function to move the pointer in any direction along the first and second axes. In addition, means can be provided for biasing the joystick toward the neutral point.

According to another aspect, the present invention which achieves at least one of these objectives relates to a portable information displaying apparatus comprising an information display unit provided in a first surface of a casing and including a pointer displayed thereon. The apparatus further comprises a track ball provided in at least one of surfaces of the casing perpendicular to the first surface to control the movement of the pointer on the information display unit. The track ball has a clicking function for inputting information in association with the pointer.

DESCRIPTION OF THE PREFERRED EMBODIMENTS

Preferred embodiments of the present invention will be described below in detail with reference to the accompanying drawings.

(First Embodiment)

Figure 1A:
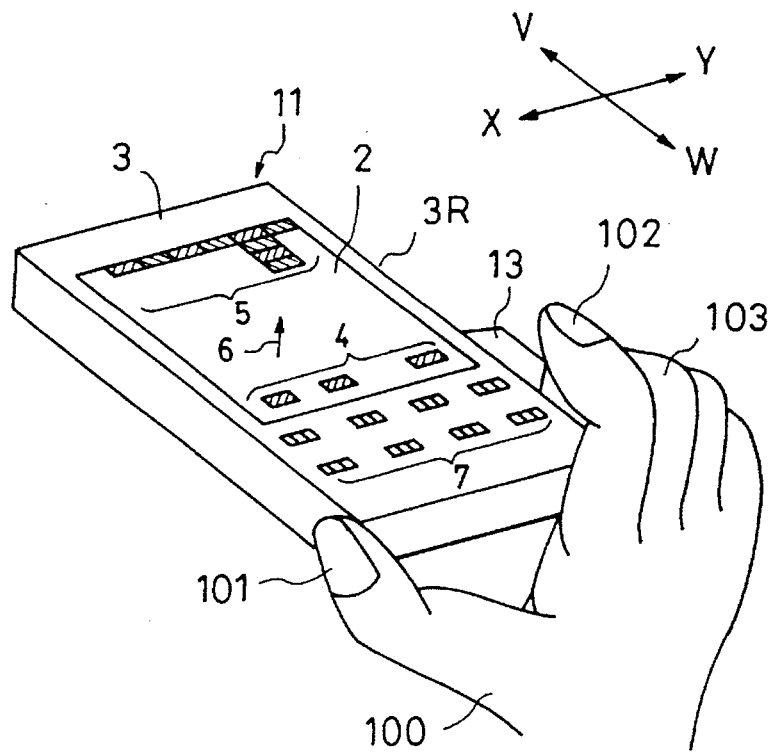
FIGS. 1(A) and 1(B) are perspective views of the construction of a first embodiment of the present invention, generally showing the obverse side (A) and the reverse side (B) thereof, respectively.
Figure 1B:
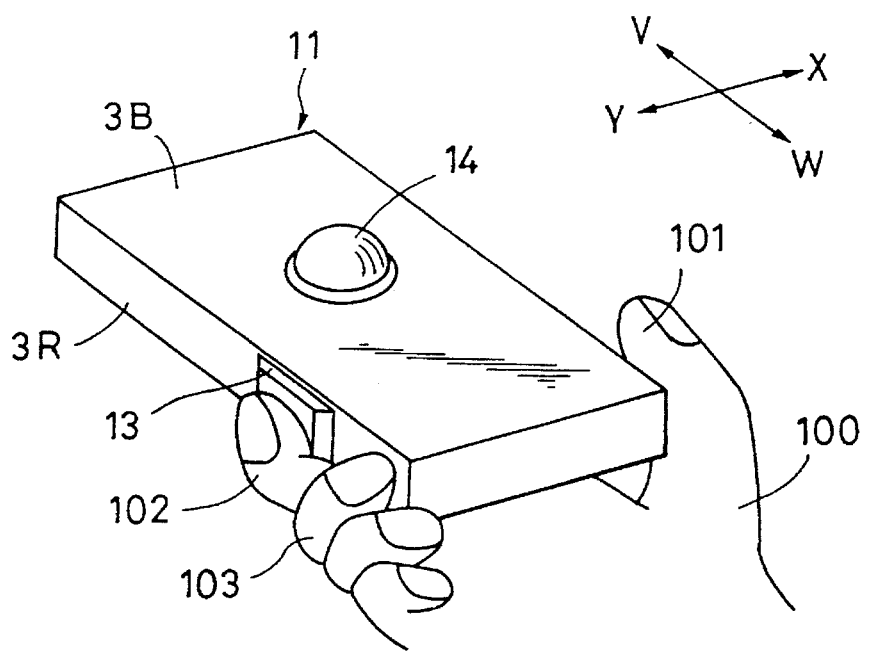
Figure 11:
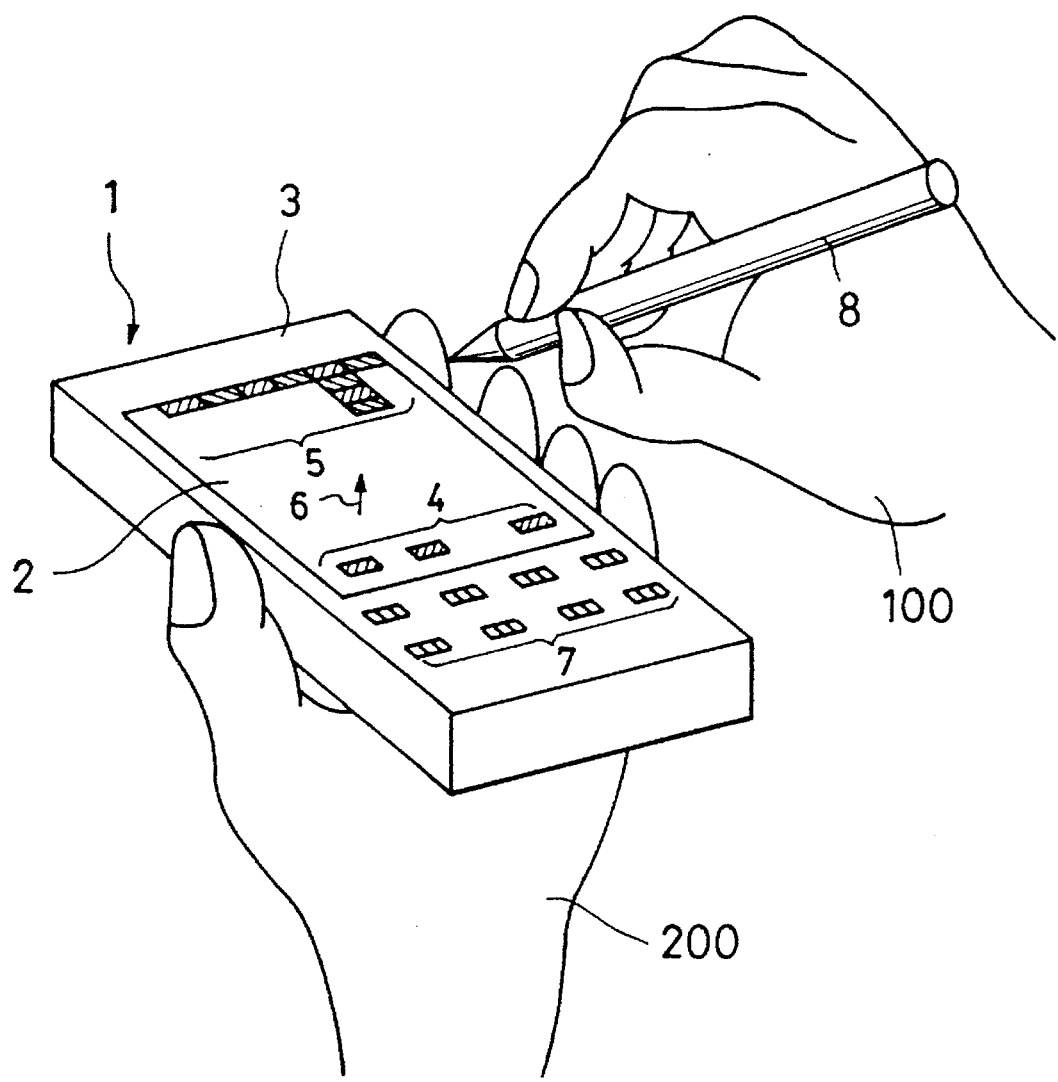
FIG. 11 is a perspective view showing the construction of a conventional portable information apparatus along with an input operation.

FIGS. 1A and 1B show the first embodiment of a portable information apparatus in accordance with the present invention. The same reference numerals used in both this embodiment and the FIG. 11 embodiment denote identical elements. The information apparatus has a main body or casing 11, a click button 13 provided in a right surface 3R of the apparatus body 11, and a mouse ball 14 provided in a reverse or bottom surface 3B of the apparatus body 11. Components of this embodiment provided in an upper surface 3 are the same as those of the above-described conventional information apparatus.

The body 11 of the thus-constructed apparatus is held by the thumb 101, the forefinger 102 and the middle finger 103 of a right hand 100 of an operator, and the click button 13 is disposed so as to be operable by the right hand forefinger 102.

To move the pointer 6 in the direction of arrow X, Y, V or W, the reverse surface 3B of the apparatus body 11 is pressed against a suitable object such as a table, and, in this state, the right hand 100 is moved in the same direction to move the apparatus body 11. A mouse ball 14 provided in the reverse surface 3B of the apparatus body 11 is thereby rotated and the rotation of the mouse ball 14 is transmitted to a mechanism (not shown) provided in the main body. As a result, the pointer 6 is moved in the information display 2 in the same direction as the direction of movement of the main body to an extent corresponding to the extent of movement of the main body. The operator can select one of the icons 4 and the contents of the menu bar 5 on the information display 2 by the above-described operation.

A drag operation for moving each of the icons 4 or the contents of the menu bar 5 is performed by moving the apparatus body 11 so that the mouse ball 14 is rotated with the click button 13 pressed by the right hand forefinger 102. This operation is an ordinary mouse operation.

To select one of the icons 4 and the contents of the menu bar 5, the click button 13 is operated by the right hand forefinger 102.

As described above, the operations of displaying and looking up a telephone directory, an address book and a schedule, connecting the apparatus to a terminal at the other end of a communication line, and referring to a memory can be performed using only the right hand 100.

The relationship between the directions of movement of the apparatus body 11 and the pointer 6 in a direction along the axis X-Y may be determined as desired by the operator. That is, the arrangement may be such that when the apparatus body 11 is moved in the direction X, the pointer 6 is moved in the same direction or in the direction Y. The relationship between the movements of the apparatus body 11 and the pointer 6 may also be determined in the same manner with respect to the directions along the axis V-W. This direction setting may be made by operating a changeover knob (not shown) provided one a suitable portion of the apparatus body 11 or some of the groups of operating buttons 7 or through the icons 4 and the menu bar 5.

This function is effective particularly in a case where the mouse ball 14 is directly rotated by an operator's finger on the reverse side 3B of the apparatus body 11, and where it is suitable to move the pointer 6 in the same direction as a direction of movement of the finger.

(Second Embodiment)

Figure 2A:
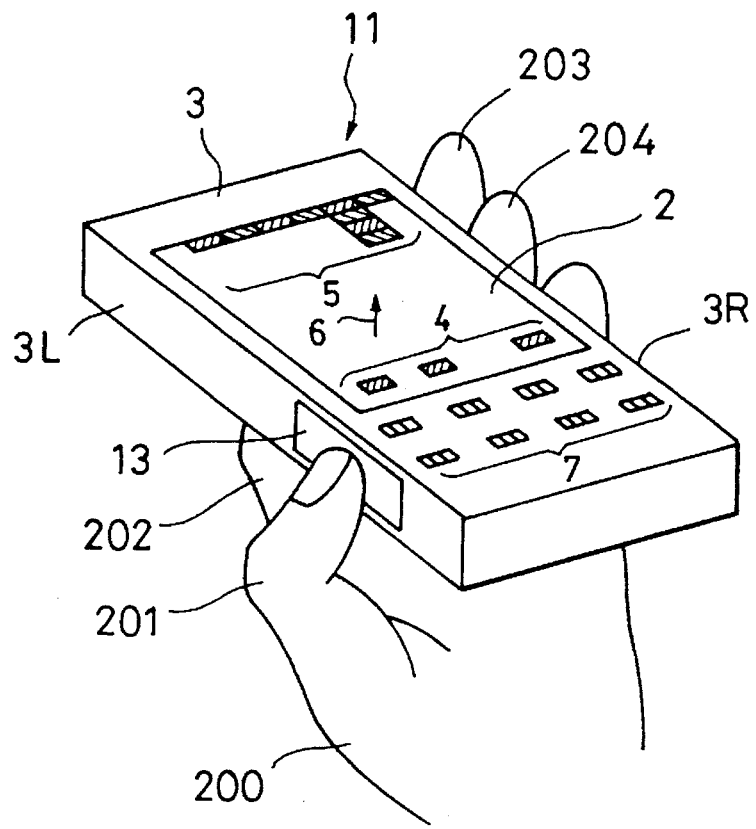
FIGS. 2(A) and 2(B) are perspective views of the construction of a second embodiment of the present invention, generally showing the obverse side (A) and the reverse side (B) thereof, respectively.
Figure 2B:
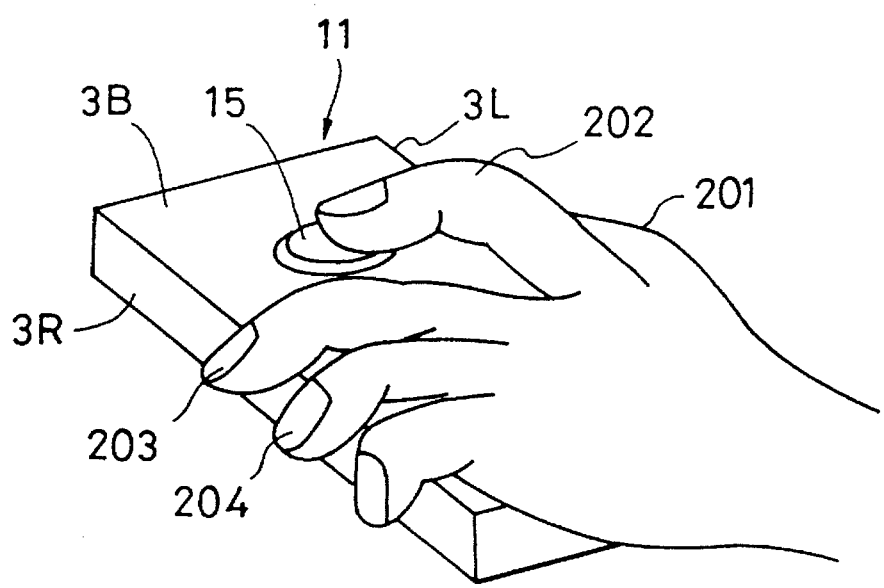

FIGS. 2(A) and 2(B) show the second embodiment of the present invention. In these figures the same reference numerals as those shown in FIGS. 1 and 11 denote identical elements. As shown in FIGS. 2(A), a click button 13 is provided in a left side surface 3L of the apparatus body 11. As shown in FIG. 2(B), a track ball 15 is provided in the reverse or bottom surface 3B of the apparatus body 11.

An operator can hold the body 11 of the thus-arranged apparatus in his or her left hand 200, as shown in FIG. 2(A), with fingers 203 and 204 contacting the right side surface 3R of the apparatus body 11, and can directly operate the track ball 15 by the left hand forefinger 202, as shown in FIG. 2(B), to move the pointer 6 displayed on the information display 2. For inputting information pointed to with the pointer 6 on the display portion 2 with a click input, the operator may operate the click button 13 disposed in the left side surface 3L of the apparatus body 11 with the left hand thumb 201.

With respect to the operation of rotating the track ball 15, it is desirable that the direction in which the left hand forefinger 202 is moved and the direction in which the pointer 6 moves on the information display 2 coincide with each other if a natural feeling eye-hand coordination is desired. However, this relationship between these directions can be easily reversed by a simple changeover operation, as described above with respect to the first embodiment.

A drag operation may be performed by rotating the track ball 15 with the left hand forefinger 202 while the click button 13 is maintained in a depressed state by the left hand thumb 201.

In this embodiment, as described above, any input operation can be performed by one hand, i.e., the left hand 200, while the apparatus body 11 is held by the left hand 200.
(Third Embodiment)

Figure 3A:
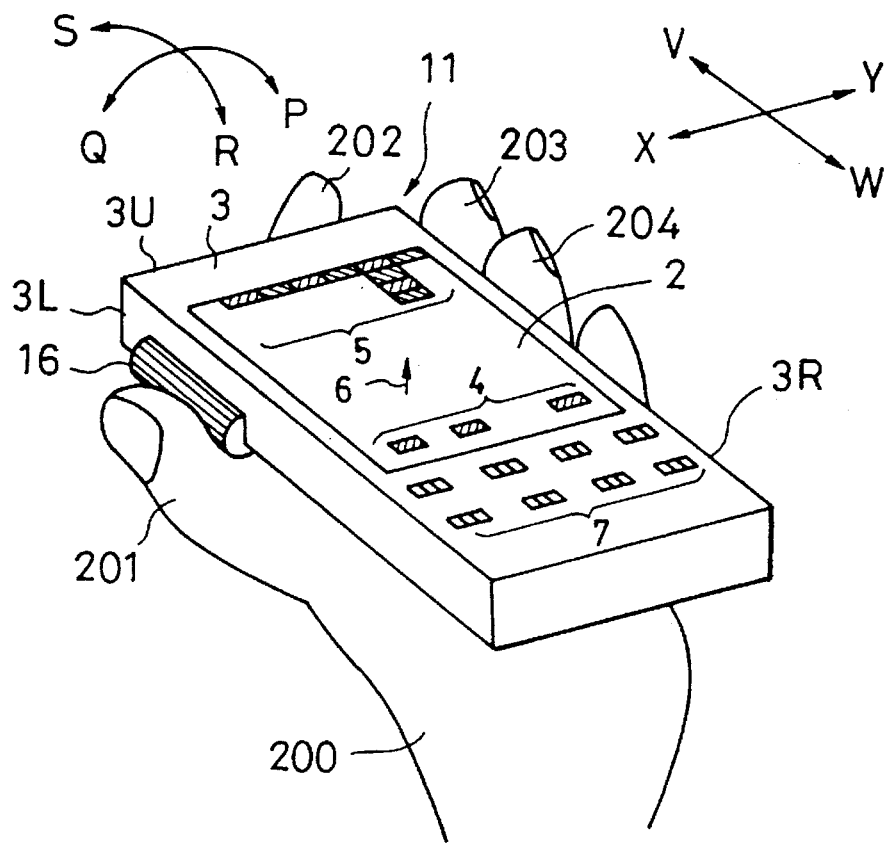
FIGS. 3(A) and 3(B) are perspective views of the construction of a third embodiment of the present invention, generally showing the obverse side (A) and the reverse side (B) thereof, respectively.
Figure 3B:
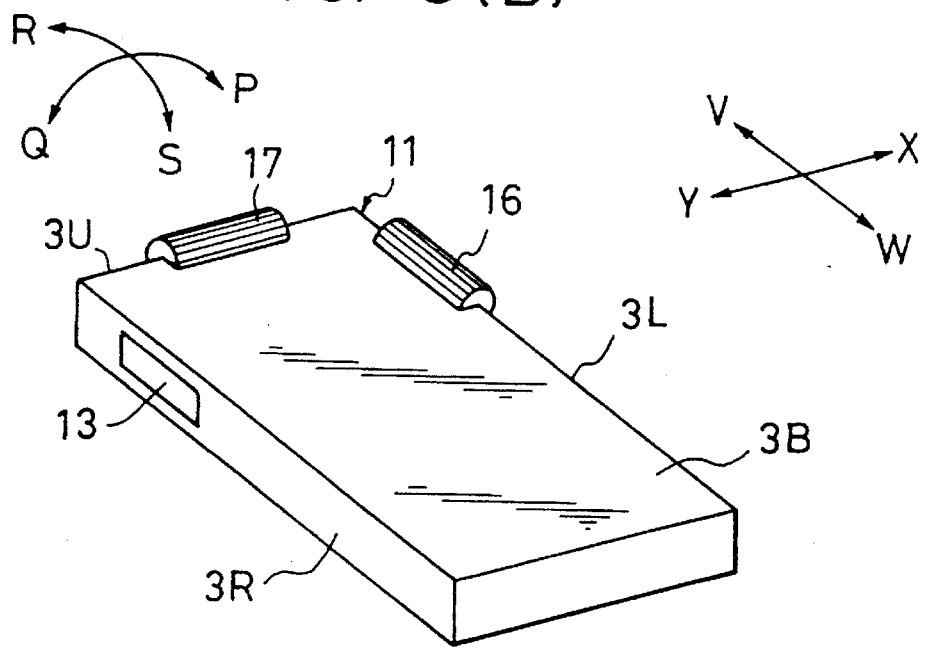

FIGS. 3(A) and 3(B) show the third embodiment of the present invention. Identical reference numerals to those in the first and second embodiments denote identical elements. As shown in FIG. 3(B), a first roller 16 is disposed in the left side surface 3L of the apparatus body 11 with its axis offset from the central longitudinal axis of the surface 3L toward the reverse surface 3B. Also, a second roller 17 is disposed in an upper side surface 3U of the apparatus body 11 with its axis offset from the central longitudinal axis of the surface 3U toward the reverse surface 3B. Thus, the first roller 16 and the second roller 17 are closer to the bottom surface 3B than the upper surface 3. A click button 13 is disposed in the right side surface 3R of the apparatus body 11, as shown in FIG. 3(B).

An operator holds the body 11 of the thus-arranged apparatus with the left hand 200, as shown in FIG. 3(A), and rotates the first roller 16 with the left hand thumb 201 to move the pointer 6 in a direction along the axis X-Y on the information display 2. For the movement of the pointer 6 along the axis V-W on the information display 2, the operator rotates the second roller 17 with the left hand forefinger 202. The click button 13 may be operated by the left hand middle finger 203 or the left hand medial finger 204.

A drag operation is performed by rotating the first roller 16 and the second roller 17 with the left hand thumb 201 and the left hand forefinger 202, respectively, while the click button 13 is maintained in a depressed state with the left hand middle finger 203 or the left hand medial finger 204.

In this case, referring to FIG. 3(A), it is natural to move the pointer 6 in the direction of arrow Y when the first roller 16 is rotated in the direction of arrow P, and it is natural to move the pointer 6 in the direction of arrow X when the first roller 16 is rotated in the direction of arrow Q. Also, it is natural to move the pointer 6 in the direction of arrow V when the second roller 17 is rotated in the direction of arrow S, and it is natural to move the pointer 6 in the direction of arrow W when the second roller 17 is rotated in the direction of arrow R. However, the arrangement may be such that the operator can freely select the relationship between the direction of rotation of each of the first and second rollers 16 and 17 and the direction of movement of the pointer 6 through the information display 2 and the groups of operating buttons 7.

As described above, it is desirable that the direction in which the first roller 16 or the second roller 17 is rotated and the direction in which the pointer 6 is moved are in the above-mentioned relationship, if a natural feeling eye-hand coordination is taken into consideration. However, the relationship can be easily reversed, as mentioned above.

In this embodiment, as described above, all input operations can be performed with one hand by using the first and second rollers 16 and 17 and the click button 13 while holding the apparatus body 11 with the left hand 200.
(Fourth Embodiment)

Figure 4A:
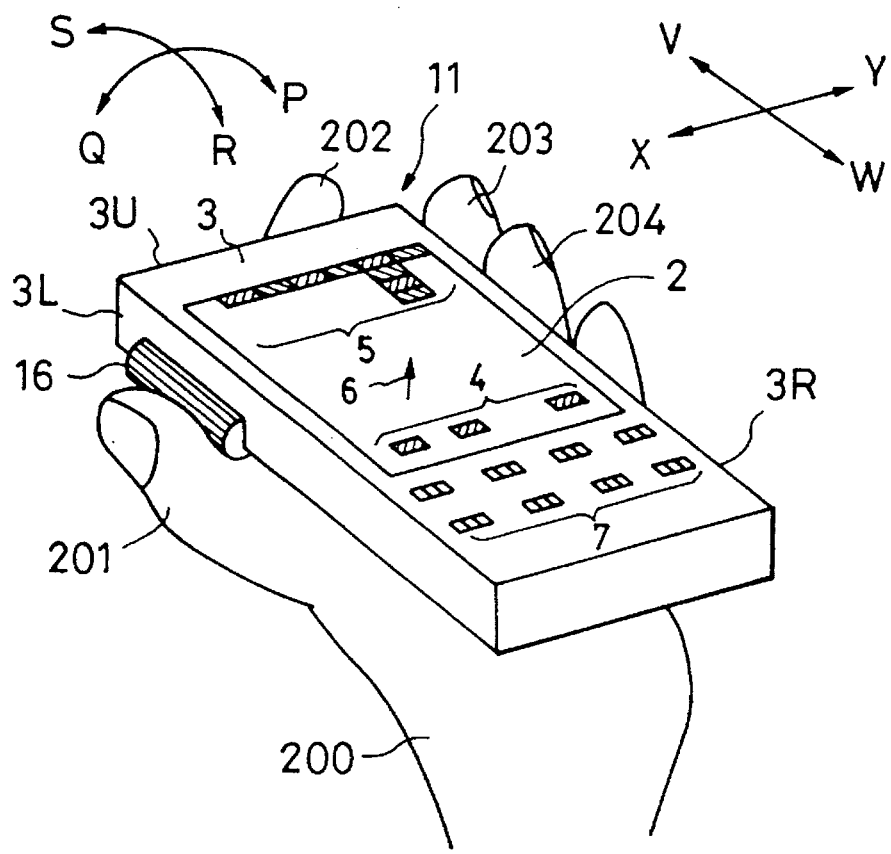
FIGS. 4(A) and 4(B) are perspective views of the construction of a fourth embodiment of the present invention, generally showing the obverse side (A) and the reverse side (B) thereof, respectively.
Figure 4B:
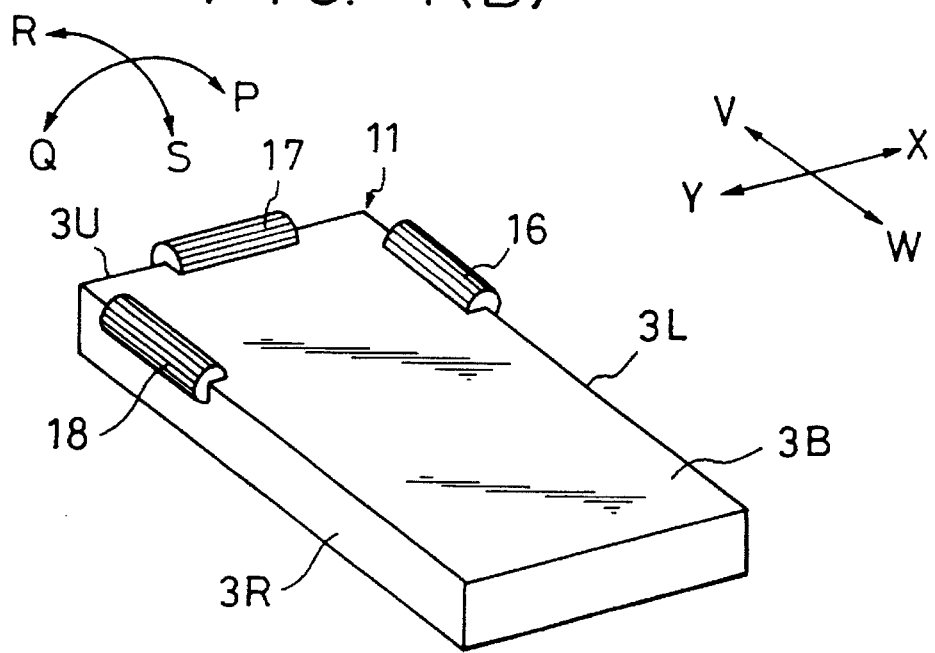

FIGS. 4(A) and 4(B) show the fourth embodiment of the present invention. Reference numerals identical to the first three embodiments denote identical elements. Referring to FIG. 4(B), a third roller 18 is disposed in the right side surface 3R of the apparatus body 11 with its axis offset from a center longitudinal axis of the right side surface 3R toward the reverse surface 3B. Thus, the third roller 18 is closer to the bottom surface 3B than the upper surface 3. In this embodiment, each of the first roller 16, the second roller 17 and the third roller 18 is urged from the inside toward the outside of the apparatus body 11 by a resilience means (not shown). If each of these rollers is pressed into the apparatus body 11 against the bias of the resilience means, a click switch (not shown) provided in the apparatus body 11 and linked to the roller is turned on.

An operator holds the body 11 of the thus-arranged apparatus with the left hand 200, as shown in FIG. 4(A). In this state, the operator can rotate the first roller 16 in the direction Q with the left hand thumb 201 to move the pointer 6 in the direction X on the information display 2, and can rotate the third roller 18 in the direction P with the left hand middle finger 203 or the left hand medial finger 204 to move the pointer 6 in the direction Y on the information display 2. Also, the operator can rotate the second roller 17 in the direction S or R with the left hand forefinger 202 to rotate the pointer 6 in the direction V or W on the information display 2. A click operation can be performed by pressing one of the first roller 16, the second roller 17 and the third roller 18 into the apparatus body 11.

A drag operation is performed by rotating one or two of the first roller 16, the second roller 17 and the third roller 18 in combination with each other, the roller which is not to be rotated being pressed into the apparatus body 11. Needless to say, one roller to be rotated may be the roller to be forced into the apparatus body.

This embodiment is characterized by being arranged so that the first roller 16 is rotated mainly in the direction Q by the left hand thumb 201, while the third roller 18 is rotated mainly in the direction P by the left hand middle finger 203 or the left hand medical finger 204. That is, the arrangement is such that, for the movement of the pointer 6 along the axis X-Y on the information display 2, any of the left hand thumb 201, the left hand middle finger 203 and the left hand medial finger 204 can be selected when it can operate freely, thus achieving an improvement in handling.

The arrangement may alternatively be such that the first roller 16 is rotated only in the direction Q while the third roller 18 is rotated only in the direction P, and the rotation of each roller in the other direction is inhibited.

It is natural to move the pointer 6 in the direction Y when the first roller 16 or the third roller 18 is rotated in the direction P, and it is natural to move the pointer 6 in the direction X when the first roller 16 or the third roller 18 is rotated in the direction Q. Also, it is natural to move the pointer 6 in the direction V when the second roller 17 is rotated in the direction S, and it is natural to move the pointer 6 in the direction W when the second roller 17 is rotated in the direction R.

However, the direction of rotation of each of the first roller 16, the second roller 17 and the third roller 18 and the direction of movement of the pointer can be selected freely by the operator through the information display 2 and the groups of operating buttons 7.

In this embodiment, as described above, all input operations can be performed with one hand by using the first roller 16, the second roller 17 and the third roller 18 while holding the apparatus body 11 by the left hand 200.

In this embodiment, two rollers, i.e., the first roller 16 and third roller 18 can be freely selected and used to move the pointer in a certain direction, and this function contributes to an improvement in handling. With respect to fingering, one finger may be moved only in a direction in which it is easily movable, so that the handling facility of the apparatus is further improved.

With respect to the click operation, the roller, i.e., the first roller 16, the second roller 17 or the third roller 8, which can be operated most easily, may be pressed into the main body 1. There is therefore no need for pressing a finger on a separate click button.

(Fifth Embodiment)

Figure 5A:
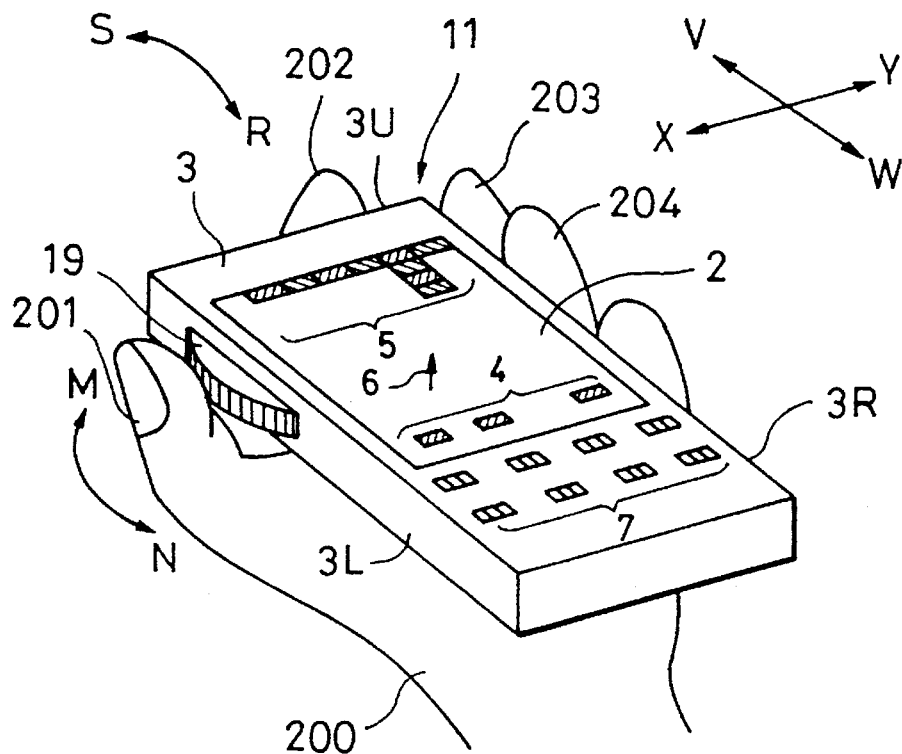
FIGS. 5(A) and 5(B) are perspective views of the construction of a fifth embodiment of the present invention, generally showing the obverse side (A) and the reverse side (B) thereof, respectively.
Figure 5B:
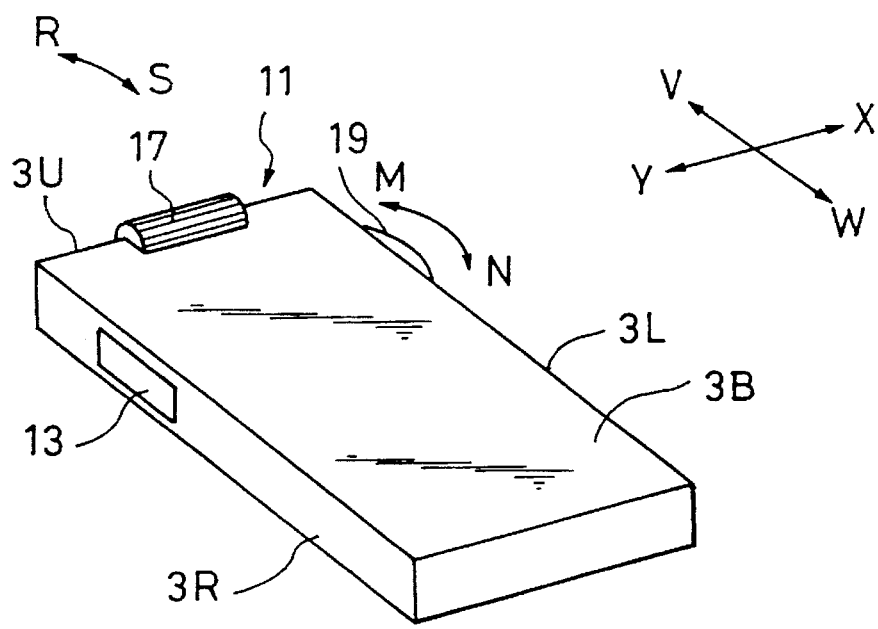

FIGS. 5(A) and 5(B) show the fifth embodiment of the present invention. Reference numerals identical to the first four embodiments denote identical elements. A dial 19 partially projects through the left side surface 3L of the apparatus body 11 shown in FIGS. 5(A) and 5(B) so as to be rotatable by a finger. The dial 19 is rotatable about an axis perpendicular to the upper surface 3. The dial 19 functions to move the pointer 6 in the direction X by being rotated in the direction of arrow M, and to move the pointer 6 in the direction Y by being rotated in the direction of arrow N. The dial 19 is positioned closer to the bottom surface 3B than the upper surface 3. A roller 17 (corresponding to the above-described second roller 17 and also referred to as "second roller 17" hereinafter) is disposed in a portion of the upper side surface 3U of the apparatus body 11 with its axis offset from the central longitudinal axis of the upper side surface 3U toward the reverse or bottom surface 3B. Thus, the second roller 17 is closer to the bottom surface 3B than the upper surface 3. Referring to FIG. 5(A), the second roller 17 can be rotated in the direction S to move the pointer 6 in the direction V, and can be rotated in the direction R to move the pointer 6 in the direction W. A click operation is performed with a click button 13 provided in the right side surface 3R of the apparatus body 11.

An operator holds the apparatus body 11 of the thus-arranged apparatus by the left hand 200 and rotates the dial 19 with the left hand thumb 201 to move the pointer 6 in a direction along the axis X-Y on the information display 2. On the other hand, to move the pointer 6 along the axis V-W on the information display 2, the operator rotates the second roller 17 in the direction S or R with the left hand forefinger 202. The click button 13 can be operated by the left hand middle finger 203 or the left hand medial finger 204.

A drag operation may be performed by rotating the dial 19 and the second roller 17 with the left hand thumb 201 and the left hand forefinger 202, respectively, while the click button 13 is maintained in the depressed state by the left hand middle finger 203 or the left hand medial finger 204.

With respect to this operation, the relationship between the direction of rotation of the dial 19 and the direction of movement of the pointer 6 and the relationship between the direction of rotation of the second roller 17 and the direction 6f movement of the pointer 6 can be selected as desired.

In this embodiment, as described above, all input operations can be performed with one hand by using the dial 19, the second roller 17 and the click button 13 while holding the apparatus body 11 with the left hand 200.

(Sixth Embodiment)

Figure 6A:
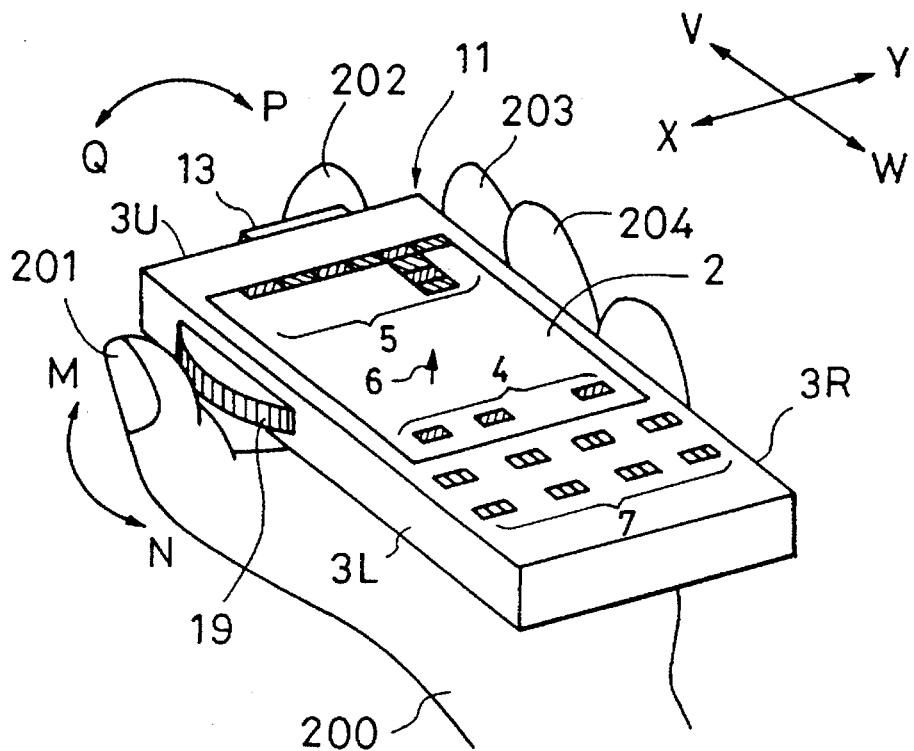
FIGS. 6(A) and 6(B) are perspective views of the construction of a sixth embodiment of the present invention, generally showing the obverse side (A) and the reverse side (B) thereof, respectively.
Figure 6B:
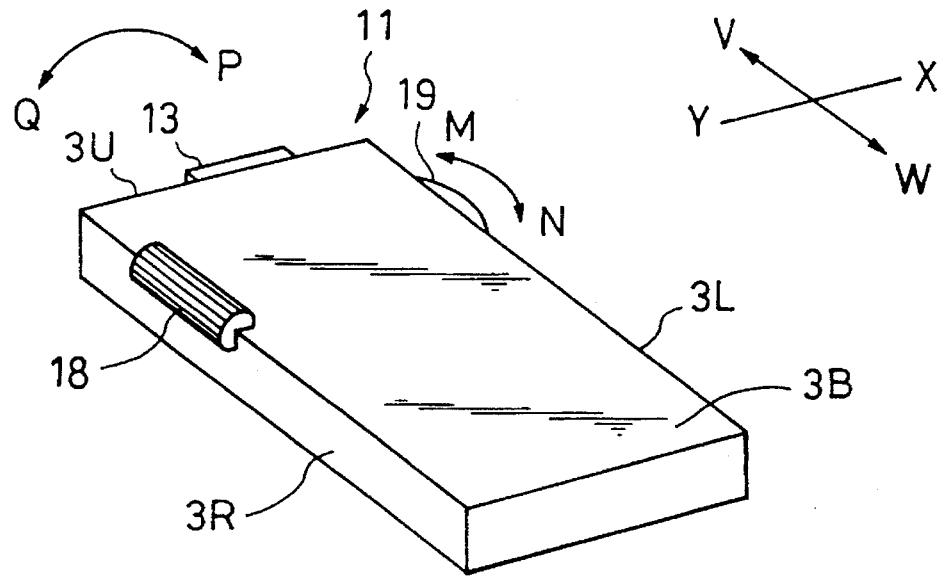

FIGS. 6(A) and 6(B) show the sixth embodiment of the present invention. The reference numerals used in FIGS. 6(A) and 6(B) that are identical to the reference numerals used in the first five embodiments denote identical elements. A dial 19 partially projects through the left side surface 3L of the apparatus body 11 shown in FIGS. 6(A) and 6(B) so as to be rotatable by a finger. The dial 19 functions to move the pointer 6 in the direction V by being rotated in the direction M, and to move the pointer 6 in the direction W by being rotated in the direction N. A roller 18 (corresponding to the above-described third roller 18 and also referred to as "third roller 18" hereinafter) is disposed in the right side surface 3R of the apparatus body 11 with its axis offset from the central longitudinal axis of the right side surface 3R toward the reverse or bottom surface 3B. Thus, the third roller 18 is closer to the bottom surface 3B than the upper surface 3. The third roller 18 can be rotated in the direction P to move the pointer 6 in the direction Y, and can be rotated in the direction Q to move the pointer 6 in the direction X. A click button 13 is provided in the upper side surface 3U of the apparatus body 11 and is used for a click operation.

An operator holds the apparatus body 11 of the thus-arranged apparatus with the left hand 200 and rotates the dial 19 with the left hand thumb 201 to move the pointer 6 in a direction along the axis V-W on the information display 2. To move the pointer 6 along the axis X-Y on the information display 2, the operator rotates the third roller 18 in the direction P or Q by the left hand middle finger 203 or the left hand medial finger 204. The click button 13 0 is operated by the left hand forefinger 202.

A drag operation may be performed by rotating the dial 19 and the third roller 18 with the left hand thumb 201 and the left hand middle finger 203 or the left hand medial finger 204, respectively, while the click button 13 is maintained in the depressed state by the left hand forefinger 202.

With respect to this operation, the relationship between the direction of rotation of the dial 19 and the direction of movement of the pointer 6 and the relationship between the direction of rotation of the third roller 18 and the direction of movement of the pointer 6 can be selected as desired.

In this embodiment, as described above, all input operations can be performed with one hand by using the dial 19, the third roller 18 and the click button 13 while holding the apparatus body 11 with the left hand 200.

(Seventh Embodiment)

Figure 7:
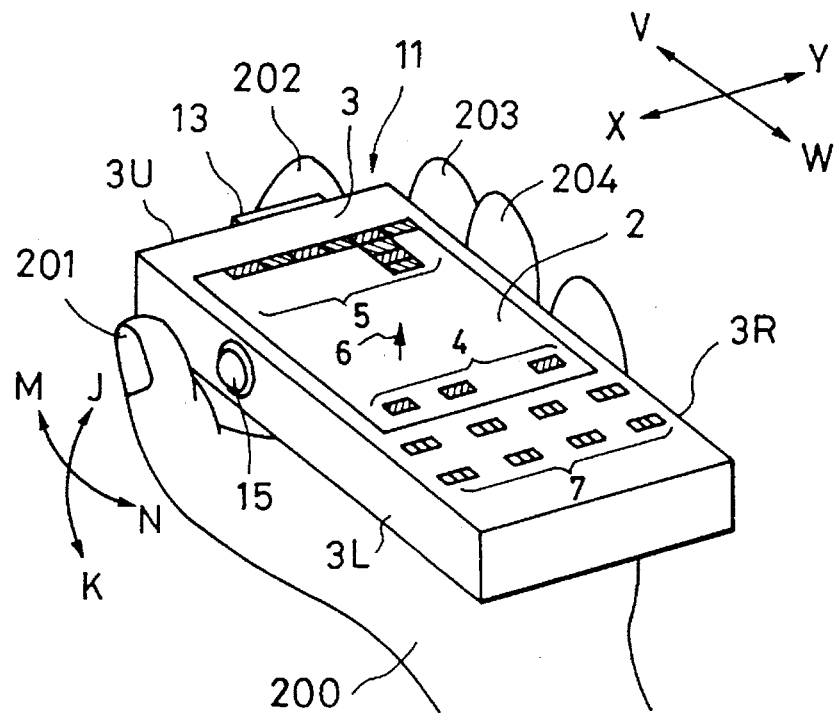
FIG. 7 is a perspective view of the construction of a seventh embodiment of the present invention, generally showing the obverse side thereof.

FIG. 7 shows the seventh embodiment of the present invention. Reference numerals which are identical to reference numerals used in the first six embodiments denote identical elements. As illustrated, a track ball 15 for moving the pointer 6 on the information display 2 along the axes X-Y and V-W is disposed in the left side surface 3L of the apparatus body 11, and a click button 13 for a click operation is disposed in the upper side surface 3U of the apparatus body 11.

An operator holds the apparatus body 11 of the thus-arranged apparatus with the left hand 200 and rotates the track ball 15 in the direction or arrow M or N or in the direction of arrow J or K with the left hand thumb 201 to move the pointer 6 in a direction along the axes V-W or Y-X, respectively. For a click input at a position pointed by the pointer 6, the click button 13 disposed in the upper side surface 3U of the apparatus body 11 is operated with the left hand forefinger 202.

A drag operation may be performed by rotating the track ball 15 with the left hand thumb 201 while the click button 13 is maintained in a depressed state with the left hand forefinger 202.

In this embodiment, as described above, any input operation can be performed with one hand, i.e., the left hand 200, while the apparatus body 11 is held with the left hand 200.

In this embodiment, the click button 13 is provided in the upper side surface 3U of the apparatus body 11. However, the click button 13 may alternatively be provided in the right side surface 3R of the apparatus body 11 to be operated by the left hand middle finger 203 or the left hand medial finger 204, or it may be provided in the left side surface 3L to be operated by the left hand thumb 201. Also, a plurality of click buttons 13, not shown, may be disposed in the upper side surface 3U, the left side surface 3L or the right side surface 3R of the apparatus body 11.

(Eighth Embodiment)

Figure 8:
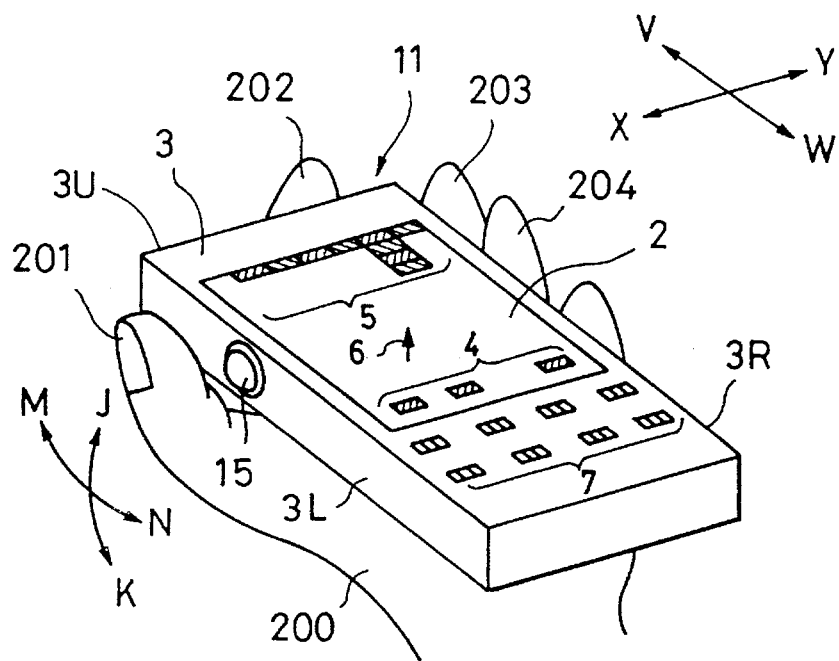
FIG. 8 is a perspective view of the construction of an eighth embodiment of the present invention, generally showing the obverse side thereof.

FIG. 8 shows the eighth embodiment of the present invention. Reference numerals which are identical to reference numerals used in the first seven embodiments denote identical elements. In this embodiment, a track ball 15 for moving the pointer 6 on the information display 2 along the axes X-Y and V-W is disposed in the left side surface 3L of the apparatus body 11. The track ball 15 is urged from the inside toward the outside of the apparatus body 11 by a spring. A click switch (not shown) is operated by pressing the ball 15 into the apparatus body 11 against the bias of the spring.

An operator holds the apparatus body 11 of the thus-arranged apparatus with the left hand 200 and rotates the track ball 15 in the direction or arrow M or N or in the direction of arrow J or K with the left hand thumb 201 to move the pointer 6 in a direction along the axes V-W or Y-X, respectively. For a click input at a position pointed by the pointer 6, the track ball 15, maintained in the same position, is pressed into the apparatus body 11.

A drag operation may be performed by rotating the track ball 15 with the left hand thumb 201 while pressing the track ball 15 into the apparatus body 11 with the thumb 201.

In this embodiment, as described above, any input operation can be performed by one hand, i.e., the left hand 200, while the apparatus body 11 is held by the left hand 200.

In this embodiment, a click button 13 may also be disposed in the upper side surface 3U of the apparatus body 11, as in the case of the arrangement shown in FIG. 7, and the arrangement may be such that a drag operation or the like is performed by operating the track ball 15 while depressing the click button 13 with the left hand forefinger 202, and an ordinary click operation is performed by pressing the track ball 15 into the apparatus body.

(Ninth Embodiment)

Figure 9A:
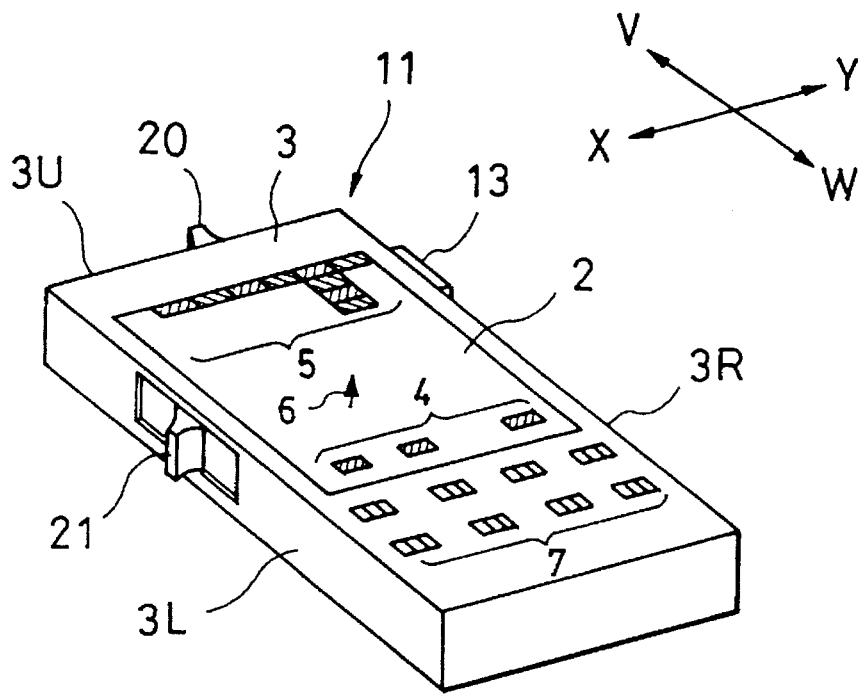
FIG. 9(A) is a perspective view of the construction of a ninth embodiment of the present invention.
Figure 9B:
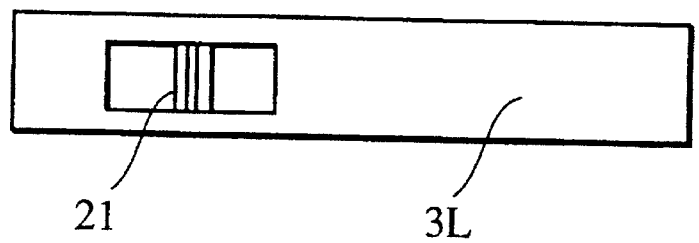
FIGS. 9(B) and 9(C) are front views of slide levers of the embodiment shown in FIG. 9(A)
Figure 9C:
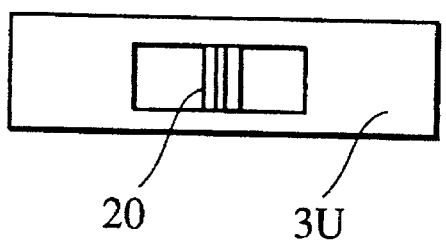

FIGS. 9(A), 9(B), and 9(C) show the ninth embodiment of the present invention. Reference numerals which are identical to reference numerals used in the first eight embodiments denote identical elements. As shown in FIG. 9(A), a slide lever 20 is provided in the upper side surface 3U of the apparatus body 11, and another slide lever 21 is provided in the left side surface 3L of the apparatus body 11. Each of the slide lever 20 and 21 has a neutral point at which they do not function to move the pointer 6 along the X-Y axis or the W-V axis. Means can be provided, such as a spring, to urge the slide levers 20 and 21 toward the neutral point. FIG. 9(B) shows a state in which means for biasing the lever 21 positions the lever 21 at the neutral point as viewed from the front side of the left side surface 3L of the apparatus body 11. FIG. 9(C) shows a state in which means for biasing the lever 20 positions the lever 20 the neutral point as viewed from the front side of the upper side surface 3U of the apparatus body 11. When the slide lever 20 is urged in the direction X from the neutral point the pointer 6 moves in the same direction and when the slide lever 20 is urged in the direction Y from the neutral point the pointer 6 moves in the same direction. On the other hand, when the slide lever 21 is urged in the direction V from the neutral point the pointer 6 moves in the same direction and when the slide lever 21 is urged in the direction W from the neutral point the pointer 6 moves in the same direction. That is, if the slide lever 20 or 21 is urged in a certain direction from the neutral point, a circuit (not shown) provided in the apparatus body detects this state and moves the pointer 6 at a certain constant speed in the direction in which the slide lever 20 or 21 is urged. A click button 13 is disposed in the right side surface 3R of the apparatus body 11 to be used for a click operation.

An operator holds the body 11 of the thus-arranged apparatus with the left hand 200, urges the slide lever 20 in a desired direction from the neutral point with the left hand forefinger 202 (not shown), and urges the slide lever 21 in a desired direction from the neutral point by the left hand thumb 201 (not shown). The pointer 6 can be thereby moved at the predetermined speeds in the directions in which the slide levers 20 and 21 are urged. To perform a click input related to an item designated by the pointer 6, the click button 13 disposed in the right side surface 3R of the apparatus body 11 can be pressed by the left hand middle finger 203 or the left hand medial finger 204.

A drag operation may be performed by moving the pointer 6 with the slide lever 20 and/or the slide lever 21 while the click button 13 is maintained in the depressed state by the left hand middle finger 203 or the left hand medial finger 204.

In this embodiment, as described above, any input operation can be performed by one hand, i.e., the left hand 200, while the apparatus body 11 is held by the left hand 200.

In this embodiment, the click button 13 is provided in the right side surface 3R of the apparatus body 11. However, the click button 13 may alternatively be provided in the left side surface 3L or in the upper side surface 3U of the apparatus body 11. Also, a plurality of click buttons 13 may be disposed in the upper side surface 3U, the left side surface 3L or the right side surface 3R of the apparatus body 11.

In this embodiment, the pointer 6 is moved at a constant speed. However, it is also possible to change the pointer 6 feed speed according to the amount of urging of the slide lever 20 or 21. Such a speed changing function is effective in finely adjusting the position of the pointer 6.

(Tenth Embodiment)

Figure 10A:
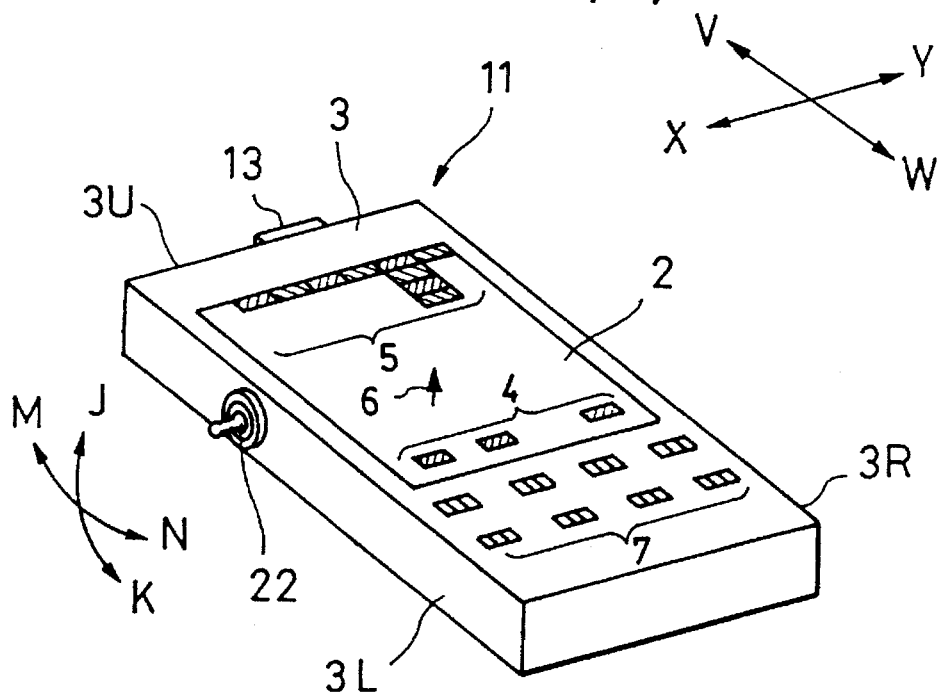
FIG. 10(A) is a perspective view of the construction of a tenth embodiment of the present invention.
Figure 10B:
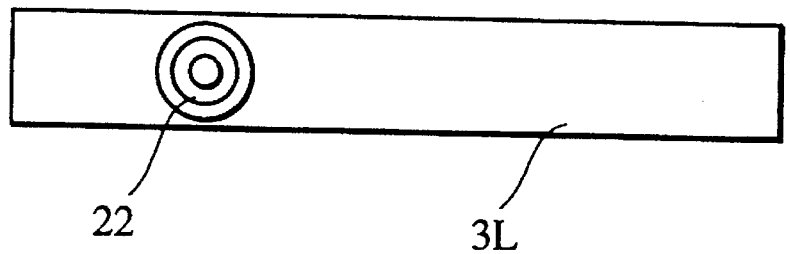
FIG. 10(B) is a front view of a joystick of the embodiment shown in FIG. 10(A)

FIGS. 10(A) and 10(B) show the tenth embodiment of the present invention. Reference numerals which are identical to reference numerals used in the first nine embodiments denote identical elements. As shown in FIG. 10(A), a joystick 22 is provided in the left side surface 3L of the apparatus body 11. The joystick 22 has a neutral point at which its does not function to move the pointer 6 in any direction along the X-Y or W-V axes and can be arbitrarily urged and moved in four directions M, N, J, and K. Means, such as a spring, are provided, to bias the joystick 22 toward the neutral position. FIG. 10(B) shows a state of the joystick 22 at the neutral point as viewed from the front side of the left side surface 3L of the apparatus body 11. The joystick 22 can be urged in the direction M from the neutral point to move the pointer 6 in the direction V and can be urged in the direction N from the neutral point to move the pointer 6 in the direction W. Also, the joystick 22 can be urged in the direction J from the neutral point to move the pointer 6 in the direction Y and can be urged in the direction K from the neutral point to move the pointer 6 in the direction X. That is, if the joystick 22 is urged in a certain direction from the neutral point, a circuit (not shown) provided in the apparatus body detects this state and moves the pointer 6 at a certain constant speed in the direction in which the joystick 22 is urged. A click button 13 is disposed in the upper side surface 3U of the apparatus body 11 to be used for a click operation.

An operator holds the body 11 of the thus-arranged apparatus with the left hand 200, and urges the joystick 22 in a desired direction from the neutral point with the left hand thumb 201. The pointer 6 can be thereby moved at a certain speed in a direction corresponding to the direction in which the joystick 22 is urged. To perform a click input related to an item designated by the pointer 6, the click button 13 disposed in the upper side surface 3U of the apparatus body 11 is depressed with the left hand forefinger 20.

A drag operation may be performed by moving the pointer 6 with the joystick 22 while the click button 13 is maintained in the depressed state by the left hand forefinger 202.

In this embodiment, as described above, any input operation can be performed by one hand, i.e., the left hand 200, while the apparatus body 11 is held by the left hand 200.

In this embodiment, the click button 13 is provided in the upper side surface 3U of the apparatus body 11. However, the click button 13 may alternatively be provided in the left side surface 3L or the right side surface 3R of the apparatus body 11. Further, a plurality of click buttons 13 may be disposed in the upper side surface 3U, the left side surface 3L or the right side surface 3R of the apparatus body 11.

In this embodiment, the pointer 6 is moved at a constant speed. However, it is also possible to change the pointer 6 feed speed according to the amount of urging of the joystick 22. Such a speed changing function is suitable for finely adjusting the position of the pointer 6.

The arrangement may alternatively be such that the joystick 22 is disposed in the upper side surface 3U of the apparatus body 11 while the click button 13 is disposed on one of or each of the left side surface 3L and the right side surface 3R, thereby achieving the same advantages of the invention.

Further, the arrangement may be such that the joystick 22 may be positioned on a left shoulder portion of the apparatus body 11, i.e., a ridge portion between the upper side surface 3U and the left side surface 3L, or on a right shoulder portion of the apparatus body, i.e., a ridge portion between the upper side surface 3U and the right side surface 3R. Alternatively, the joystick 22 may be disposed at each of these and above-mentioned positions for a further improvement in handling.

In the above-described embodiments, the operating members are disposed in particular positions. However, the present invention is essentially intended to operate a portable information apparatus with one hand, and various arrangements for achieving this effect have been described. Therefore, the constellation and the positions of the operating members may be suitably selected and combined according to the size and configuration of the apparatus, as necessary. Also, the positions of such members may be changed for an improvement in handling.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. A portable information displaying apparatus for displaying information input with the same hand holding said apparatus, comprising:

a casing having a first upper surface, a second bottom surface, and a third side surface perpendicular to the upper surface including an operating button thereon, the casing having a size and shape to fit in one hand of a user;

a stationary information display unit provided on said upper surface of said casing and including a pointer displayed thereon; and movement input control means, provided on said bottom surface of said casing opposite to said upper surface, for controlling the movement of the pointer of said information display unit by rotating in a freely-selected direction, the operating button controlling an operation on said information display unit, whereby information can be inputted into said apparatus with the same hand holding said apparatus.

2. An apparatus according to claim 1, further comprising a click button provided in a surface other than the bottom surface in which said movement input control means is disposed, said click button being usable in association with the pointer to input information.

3. An apparatus according to claims 1 or 2, wherein the direction of rotation of said movement input control means and the direction of movement of the pointer coincide with each other.

4. An apparatus according to claims 1 or 2, wherein the direction of rotation of said movement input control means and the direction of movement of the pointer are opposite from each other.

5. An apparatus according to claims 1 or 2, further comprising setting means for selectively setting the relationship between the direction of rotation of said movement input control means and the direction of movement of the pointer.

6. A portable information displaying apparatus for displaying information input with the same hand holding said apparatus, comprising:

a casing having a first upper surface and a second bottom surface, said casing having a size and shape to fit in one hand of a user;

a stationary information display unit provided on said upper surface of said casing and including a pointer displayed thereon;

an operating button, controlling an operation on said information display unit, located on one of a third and fourth surface of said casing, both of which are perpendicular to the upper surface;

a first roller member provided in the third surface of said casing perpendicular to said upper surface, said first roller member being usable to control the movement of the pointer along a first axis on said information display unit; and a second roller member provided in the fourth surface of said casing, said second roller member being usable to control the movement of the pointer along a second axis on said information display unit, whereby information can be inputted into said apparatus with the same hand holding said apparatus.

7. An apparatus according to claim 6, wherein said first roller member is disposed in the third surface at a position closer to said bottom surface of the casing opposite said upper surface than said upper surface, and wherein said second roller member is disposed in the fourth surface at a position closer to the fifth surface than the upper surface.

8. An apparatus according to claims 6 or 7, further comprising a click button provided in a sixth surface different than the third surface in which said first roller member is disposed and the fourth surface in which said second roller member is disposed, the sixth surface being perpendicular to the upper surface, and wherein said click button is usable in association with the pointer to input information.

9. An apparatus according to claims 6 or 7, further comprising a click button provided in the third surface in which said first roller member is disposed, the click button being disposed adjacent to said first roller member, said click button being used in association with the pointer to input information.

10. A portable information displaying apparatus for displaying information input with the same hand holding said apparatus, comprising:

a casing having a first upper and a second bottom surface thereon, said casing having a size and a shape to fit in one hand of a user;

a stationary information display unit provided on said upper surface of said casing and including a pointer displayed thereon;

an operating button, controlling an operation on said information display unit, located on a surface of said casing perpendicular to the upper surface;

a first roller member provided in a third surface of said casing perpendicular to said upper surface, and first roller member being usable to control the movement of the pointer along a first axis on said information display unit;

a second roller member provided in a fourth surface of said casing perpendicular to each of the upper and third surfaces, said second roller member being usable to control the movement of the pointer in one of opposite directions along a second axis on said information display unit; and a third roller member provided in a fifth surface of said casing which is perpendicular to each of said upper surface and said bottom surface opposite from said upper surface, the fifth surface being opposite from the third surface, said third roller member being usable to control the movement of the pointer in the other of opposite directions along the second axis on said information display unit, whereby information can be inputted into said apparatus with the same hand holding said apparatus.

11. An apparatus according to claim 10, wherein said first roller member is disposed in the third surface at a position closer to said bottom surface than said upper surface, wherein said second roller member is disposed in the fourth surface at a position closer to the bottom surface than the upper surface, and wherein said third roller member is disposed in the fifth surface at a position closer to the bottom surface than the upper surface.

12. An apparatus according to claims 10 or 11, further comprising a click button provided in at least one of the third surface in which said first roller member is disposed, the fourth surface in which said second roller member is disposed and the fifth surface in which said third roller member is disposed, said click button being used in association with the pointer to input information.

13. An apparatus according to claims 10 or 11, further comprising a click button provided adjacent to said first roller member at the position where said first roller member is disposed, said click button being used in association with the pointer to input information.

14. A portable information displaying apparatus for displaying information input with the same hand holding said apparatus comprising:

a casing having a first upper surface, a second bottom surface, the casing having a size and shape to fit in one hand of a user;

a stationary information display unit provided on said upper surface of said casing and including a pointer displayed thereon;

an operating button, controlling an operation on said information display unit, located on a surface of said casing perpendicular to said upper surface;

a roller member provided in a third surface of said casing perpendicular to each of said upper surface and said bottom surface opposite from said upper surface, said first roller member being usable to control the movement of the pointer along a first axis on said information display unit; and a dial member provided in a fourth surface of said casing perpendicular to each of said upper and third surfaces, said dial member being rotatable about an axis perpendicular to said upper surface to control the movement of said pointer along a second axis on said information display unit, whereby information can be inputted into said apparatus with the same hand holding said apparatus.

15. An apparatus according to claim 14, wherein said roller member is disposed in the third surface at a position closer to the bottom surface than the upper surface.

16. An apparatus according to claims 14 or 15, further comprising a click button provided in a surface of the casing other than the third surface in which said roller member is disposed and the fourth surface in which said dial member is disposed, said click button being usable in association with the pointer to input information.

17. A portable information displaying apparatus for displaying information input with the same hand holding apparatus, comprising:

a casing having a first upper surface and a second bottom surface, the casing having a size and shape to fit in one hand of a user;

a stationary information display unit provided on said upper surface of said casing and including a pointer displayed thereon;

a track ball provided in one of third and fourth surfaces of said casing each perpendicular to said upper surface and said bottom surface opposite from said upper first surface, said track ball being usable to control the movement of the pointer on said information display unit; and a click button provided adjacent to said track ball and usable in association with the pointer to input information, whereby information can be inputted with the same hand holding said apparatus.

18. A portable information displaying apparatus for displaying information input with the same hand holding said apparatus, comprising:

a casing having a first upper surface and a second bottom surface, the casing having a size and shape to fit in one hand of a user;

a stationary information display unit provided on said upper surface and including a pointer displayed thereon;

a track ball provided in one of third and fourth surfaces of the casing each perpendicular to said upper surface and said bottom surface opposite from said upper surface, said track ball being usable to control the movement of the pointer on said information display unit; and a click button provided in the other of the third and fourth surfaces and usable in association with the pointer to input information, whereby information can be inputted with the same hand holding said apparatus.

19. A portable information displaying apparatus for displaying information input with the same hand holding said apparatus, comprising:

a casing having a first upper surface, and a second bottom surface, said casing having a size and shape to fit in one hand of a user;

a stationary information display unit provided on said upper surface of said casing and including a pointer displayed thereon;

an operating button controlling an operation on said information display unit, located on a surface of said casing perpendicular to the upper surface;

a first slide lever provided in one of third and fourth surfaces of said casing each perpendicular to the upper surface and the bottom surface opposite from the upper surface, said first slide lever being usable to move the pointer along a first axis on said information display unit; and a second slide lever provided in a fifth surface perpendicular to the third and fourth surfaces, said second slide lever being movable to move the pointer along a second axis on said information display unit, whereby information can be inputted into said apparatus with the same hand holding said apparatus.

20. An apparatus according to claim 19, wherein said first slide lever has a neutral point at which said first slide lever does not function to move the pointer along the first axis, and said second slide lever has a neutral point at which said second slide lever does not function to move the pointer along the second axis.

21. An apparatus according to claim 20, further comprising means for biasing each of said first and second slide levers toward the neutral point.

22. A portable information displaying apparatus for displaying information input with the same hand holding said apparatus, comprising:

a casing having an upper surface, said casing having a size and shape to fit in one hand of a user;

a stationary information display unit provided on said upper surface of said casing and including a pointer displayed thereon; and an operating button, controlling an operation on said information display unit, located on a surface of said casing perpendicular to said upper surface;

lever means provided at a corner position where two surfaces perpendicular to said upper surface intersect each other, for moving the pointer in an arbitrary direction on said information display unit, whereby information can be inputted into said apparatus with the same hand holding said apparatus.

23. An apparatus according to claim 22, wherein said lever means has a neutral point at which it does not function to move the pointer in any direction.

24. An apparatus according to claim 23, further comprising means for biasing said lever means toward the neutral point.

25. A portable information displaying apparatus for displaying information input with the same hand holding said apparatus, comprising;

a casing having an upper surface, said casing having a size and shape to fit in one hand of a user;

a stationary information display unit provided on said upper surface of said casing and including a pointer displayed thereon; and an operating button, controlling an operation on said information display unit, located on a surface of said casing perpendicular to said upper surface;

a joystick provided in at least one of surfaces of said casing perpendicular to said upper surface, said joystick being capable of moving the pointer along a first axis or a second axis on the information display unit, whereby information can be inputted into said apparatus with the same hand holding said apparatus.

26. An apparatus according to claim 25, wherein said joystick has a neutral point at which it does not function to move the pointer in any direction along the first and second axes.

27. An apparatus according to claim 26, further comprising means for biasing said joystick toward the neutral point.

28. A portable information displaying apparatus for displaying information input with the same hand holding said apparatus, comprising:

a casing having an upper surface, said casing having a size and shape to fit in one hand of a user;

a stationary information display unit provided on said upper surface and including a pointer displayed thereon; and an operating button, controlling and operation on said information display unit, located on a surface of said casing perpendicular to the upper surface;

a track ball provided in at least one of surfaces of said casing perpendicular to said upper surface to control the movement of the pointer on the information display unit, said track ball having a clicking function for inputting information in association with the pointer, whereby information can be inputted with the same hand holding said apparatus.

* * * * *

UNITED STATES PATENT AND TRADEMARK OFFICE
CERTIFICATE OF CORRECTION

PATENT NO. : 5,563,631
DATED : October 8, 1996
INVENTOR(S) : Makoto MASUNAGA

Page 1 of 3

It is certified that error appears in the above-indentified patent and that said Letters Patent is hereby corrected as shown below:

ON THE COVER PAGE:

[56] References Cited

"FOREIGN PATENT DOCUMENTS:

"60222921   11/1985   Japan"
should read
--60-222921   11/1985   Japan--.

COLUMN 6:

Line 55, "one" should read --on--.

COLUMN 10:

Line 6, "6f" should read --of--.
Line 40, "button 13 0" should read --button 13--.

UNITED STATES PATENT AND TRADEMARK OFFICE
CERTIFICATE OF CORRECTION

PATENT NO. : 5,563,631  
DATED : October 8, 1996  
INVENTOR(S) : Makoto MASUNAGA It is certified that error appears in the above-indentified patent and that said Letters Patent is hereby corrected as shown below:

COLUMN 11:

Line 67, "lever" should read --levers--.

COLUMN 12:

Line 8, "lever 20 the" should read --the lever 20 at the--.

COLUMN 15:

Line 41, "and" should read --said--.

COLUMN 17:

Line 63, "and" should be deleted.

UNITED STATES PATENT AND TRADEMARK OFFICE
CERTIFICATE OF CORRECTION

PATENT NO. : 5,563,631
DATED : October 8, 1996
INVENTOR(S) : Makoto MASUNAGA

It is certified that error appears in the above-indentified patent and that said Letters Patent is hereby corrected as shown below:

COLUMN 18:

Line 3, "surface;" should read --surface; and--.
Line 25, "and" should be deleted.
Line 28, "surface;" should read --surface; and--.
Line 30, "surfaces" should read --the surfaces--.
Line 50, "and" should be deleted.
Line 51, "and" should read --an--.
Line 53, "surface;" should read --surface; and--.
Line 54, "surfaces" should read --the surfaces--.

Signed and Sealed this

Twenty-ninth Day of April, 1997

BRUCE LEHMAN

*Attest:*

*Attesting Officer*

*Commissioner of Patents and Trademarks*